(12) United States Patent
Baumann

(10) Patent No.: US 6,810,777 B1
(45) Date of Patent: Nov. 2, 2004

(54) MACHINE TOOL

(75) Inventor: Ulrich Baumann, Lenningen (DE)

(73) Assignee: Traub Drehmaschinen GmbH, Reichenbach (DE)

( * ) Notice: Subject to any disclaimer, the term of this patent is extended or adjusted under 35 U.S.C. 154(b) by 0 days.

(21) Appl. No.: 10/392,276

(22) Filed: Mar. 19, 2003

(30) Foreign Application Priority Data

Mar. 22, 2002 (DE) .......................... 102 13 777

(51) Int. Cl.$^7$ .............................................. B23B 9/04
(52) U.S. Cl. ........................... 82/129; 82/117; 82/120; 82/121
(58) Field of Search ..................... 82/129, 120, 121, 82/117, 158, 159

(56) References Cited

U.S. PATENT DOCUMENTS

| | | | | |
|---|---|---|---|---|
| 4,439,119 A | * | 3/1984 | Petersen et al. | ............ 418/61.3 |
| 4,872,244 A | | 10/1989 | Schleich | |
| 5,111,562 A | * | 5/1992 | Burka | ......................... 29/37 R |
| 5,832,590 A | * | 11/1998 | Wuerthner | .................... 29/563 |
| 6,640,677 B2 | * | 11/2003 | Ueda et al. | .................... 82/129 |

FOREIGN PATENT DOCUMENTS

| | | |
|---|---|---|
| DE | 37 30 561 | 11/1988 |
| DE | 39 04 631 | 8/1990 |
| DE | 298 23 496 | 7/1999 |
| EP | 1 083 026 | 3/2001 |

* cited by examiner

Primary Examiner—Willmon Fridie, Jr.
(74) Attorney, Agent, or Firm—Barry R. Lipsitz; Douglas M. McAllister

(57) ABSTRACT

In order to improve a machine tool comprising a tool carrier with a tool carrier head which is mounted for rotation about an axis and has a support member with a plurality of tool receiving means, into which drivable tool units can be inserted such that gear wheels for driving all the tool units insertable into the tool receiving means are arranged and can be moved in an interior of the support member on an orbital path extending around the axis, in such a manner that some of the tool units can be driven selectively, it is suggested that a drive wheel be rotatable about a drive axis which is arranged non-coaxially in relation to the axis, that teeth of the drive wheel move on a flight path which extends such that in a drive section of the orbital path the distances between this and the flight path have the lowest values and are greater in all the other sections of the orbital path and that the teeth be in drive engagement with a gear wheel located in the drive section and extend without contact in relation to each gear wheel located outside the drive section.

23 Claims, 11 Drawing Sheets

MACHINE TOOL

The present disclosure relates to the subject matter disclosed in German application No. 102 13 777.3 of Mar. 22, 2002, which is incorporated herein by reference in its entirety and for all purposes.

The invention relates to a machine tool comprising a machine frame, a tool carrier with a tool carrier housing and a tool carrier head which is mounted on the tool carrier housing for rotation about an axis and has a support member with a plurality of tool receiving means, into which drivable tool units can be inserted such that gear wheels for driving all the tool units insertable into the tool receiving means are arranged in an interior of the support member on an orbital path extending around the axis and can be moved on the orbital path during rotation of the tool carrier head, a tool drive with a drive wheel which is arranged in the interior of the support member, can be driven by a drive motor and with which at least one of the gear wheels can be driven.

Machine tools of this type are known, for example, from German patent application No. 199 19 238 A1.

The problem with these solutions is that the drive wheel constantly drives all the gear wheels present on the orbital path together and so when individual tool units are not intended to be driven it is necessary to provide couplings.

The object underlying the invention is, therefore, to improve a machine tool of the generic type in such a manner that some of the tool units can be driven selectively in a simple manner.

This object is accomplished in accordance with the invention, in a machine tool of the type described at the outset, in that the drive wheel is rotatable about a drive axis which is arranged non-coaxially in relation to the axis, that teeth of the drive wheel move around the drive axis on a flight path which extends relative to the orbital path of the gear wheels such that in a drive section of the orbital path the distances between this and the flight path have the lowest values and are greater in all the other sections of the orbital path and that the teeth are in drive engagement with a gear wheel located in the drive section and extend without contact in relation to each gear wheel located outside the drive section on the orbital path.

The advantage of the inventive solution is to be seen in the fact that as a result of the special arrangement of the flight path of the teeth relative to the orbital path of the gear wheels the possibility has been created of driving only some of the gear wheels present on the orbital path due to the determination of the drive section and it is, therefore, possible, for example, by rotating the turret head to select the gear wheels which engage with the drive wheel due to the fact that they are moved on the orbital path into the drive section and are, consequently, driven whereas all the remaining gear wheels which are located outside the drive section are automatically not driven.

As a result, it is possible in a simple manner to drive only the gear wheels of selected tool units without additional measures, such as couplings, etc., simply due to the fact that they come to rest in the drive section on the orbital path.

In principle, it is possible to position the drive section as required. It is, in particular, possible to position the drive section at different locations of the orbital path in order to, as a result, achieve a great flexibility with respect to the gear wheels to be driven. For this purpose, the possibility of changing the relative position of the flight path in relation to the orbital path is to be provided.

A particularly favorable embodiment on account of its simplicity provides for the turret head to have the same work positions for each driven tool unit insertable into one of the tool receiving means and in the case of each tool unit located in these work positions for its gear wheel to be located within the drive section. As a result, it is automatically ensured that the drive pinion can be driven by the drive wheel when the tool unit is in its work position.

With this solution it is possible to provide as drive position not only a single rotary position of the tool carrier head but rather it is still possible to provide several rotary positions located within an angular area as work positions and so the rotation of the tool carrier head within the angular area defining work positions allows different alignments of the tool unit in relation to the workpiece.

A solution which is particularly preferred on account of its simplicity provides for each tool unit of the tool carrier head to have a work position which is defined by a fixed angular position and in which the gear wheel is located in an orbital station on the orbital path and for at least the orbital station to be located within the drive section.

This solution has the advantage that as a result of the determination of a single work position the gear wheel is always located within the drive section at the same location and, therefore, clearly definable drive ratios, in particular, with respect to realizing the required precision while the tool unit is being driven are present.

In this respect, it is particularly advantageous when only a single orbital station is located within the drive section.

With respect to the geometric realization of the inventive solution, no further details have so far been given. One advantageous embodiment provides, for example, for the gear wheels to be arranged such that their gear wheel axes intersect the axis.

It is particularly favorable when the gear wheel axes intersect the axis with one another in a common point of intersection of the gear wheel axes.

With respect to the position of the drive axis for the drive wheel and the axis, about which the tool carrier head is rotatable, no further details have so far been given. One particularly advantageous embodiment provides, for example, for the drive axis to be arranged so as to be offset parallel to the axis, about which the tool carrier head is rotatable.

Another alternative solution provides for the drive axis to extend at an angle in relation to the axis, about which the tool carrier head is rotatable.

In this respect, it is preferably provided for the drive axis and the axis to intersect in a drive axis point of intersection.

Particularly favorable geometric ratios can be achieved when the point of intersection of the drive axes and the point of intersection of the gear wheel axes coincide.

Furthermore, the position of the drive axis relative to the drive section has not been defined in greater detail. One solution which can be realized particularly favorably provides for the area of the drive axis passing through the drive wheel to extend on a side of the axis, about which the tool carrier head is rotatable, facing the drive section of the orbital path.

The geometric ratios are, in addition, particularly favorable when the drive axis and the axis, about which the tool carrier head is rotatable, are located in one plane.

This plane is preferably oriented relative to the system of axes of the machine tool such that it extends parallel to the X axis of the machine tool.

In the inventive solution it has been assumed that the teeth of the drive wheel engage with the gear wheel located in the drive section but nothing has been said as to how the engagement of the gear wheel with the teeth of the drive wheel is intended to be realizable.

In this respect, it is to be noted, in particular, that with an alignment of the gear wheel which is completely undefined in relation to the teeth the same damage caused by undefined collisions can occur during engagement.

In order to avoid at least rough collisions, it is therefore provided for the tool drive to be designed as a C axis drive controllable by a control. Such a C axis drive allows the drive wheel to be rotated in a defined manner, for example, along with the rotation of the tool carrier head, and, therefore, at least undesired collisions of such a type that two standing sets of teeth, namely the teeth of the drive wheel and those of the drive pinion, collide when they are brought into engagement with one another to be prevented.

It is even more advantageous when the teeth of the drive wheel and the gear wheel to be brought into engagement with them can be brought into a defined rotary position relative to one another prior to their engagement, wherein this defined rotary position is selected such that it reduces collisions.

In order to bring about a defined rotary position of this type, a guide means is expediently provided in addition to the drive of the drive wheel by means of a C axis and this preliminarily positions the gear wheel moving Into the teeth of the drive wheel during the rotation of the tool carrier head such that it can be brought into engagement with the teeth of the drive wheel essentially collision-free.

Such a guide means may be designed in the most varied of ways. This can, for example, operate such that the guide means brings the gear wheel, prior to the engagement with the teeth of the drive wheel, into a defined rotary position relative to the known alignment of the teeth of the drive wheel.

In this respect, it is particularly advantageous when the guide means brings the gear wheel into engagement with the teeth of the drive wheel whilst rotating. This rotary movement during the engagement of gear wheel and teeth has the effect of particularly reducing collisions.

The guide means can, in this respect, be operative only in sections of the orbital path which adjoin the drive section and be inoperative in additional sections of the orbital path so that the gear wheels can have optional rotary positions or, alternatively thereto, defined rotary positions in these additional sections.

One particularly favorable solution provides, however, for each gear wheel to pass through a respective guidance transfer position when leaving the drive section and when entering the drive section and for each gear wheel to be in a constantly defined rotary position in relation to the guidance transfer positions outside the drive section between passing through these guidance transfer positions.

Such defined rotary positions in relation to the guidance transfer positions may be brought about in a particularly advantageous manner in that a guide means is provided which maintains these rotary positions.

This could, for example, be realized in that the guide means takes over the gear wheel in the guidance transfer position and this rotary position of the gear wheel is retained until it reaches and passes through the next guidance transfer position.

This would, however, require the gear wheel to be secured non-rotatably by the guide means when leaving the drive section in the guidance transfer position and be released again with respect to its rotary movement when moving into the drive section while passing through the guidance transfer position.

A solution which can be realized even more advantageously from a constructional point of view provides for the gear wheel to be turned further by the guide means in a defined manner so that the gear wheel, when reaching the respective guidance transfer position, has the rotary position provided for it.

This guide means is preferably arranged so as to be non-rotatable in relation to the tool carrier housing and, therefore, is not rotatable with the tool carrier head.

No further details have been given in conjunction with the preceding explanations concerning the individual embodiments with respect to the arrangement of the drive wheel and the guide means relative to one another.

It would be conceivable, for example, to arrange the drive wheel on one side of the orbital path, in particular, the toothed ring on the oppositely located side. This would, however, result in a synchronous co-rotation of the drive wheel being necessary during the engagement of the gear wheel with the guide means.

It is, therefore, particularly favorable when the drive wheel and the guide means, in particular, its toothed ring are arranged on the same side of the gear wheels or the orbital path of the gear wheels. In this respect, it is possible to arrange the guide means, in particular, its toothed ring on a side of the orbital path facing the tool carrier housing or on a side of the orbital path facing away from the tool carrier housing.

With respect to the relative arrangement of the guide means, i.e., in particular, of the toothed ring of the guide means and the teeth of the drive wheel, no further details have been given in conjunction with the preceding embodiments.

It is, for example, conceivable to arrange the teeth and the toothed ring in the drive section such that the teeth extend on a side of the toothed ring of the guide means facing the drive shaft.

This solution is advantageous, in particular, when the teeth and the toothed ring are arranged on a side of the gear wheel facing the tool carrier housing.

Another advantageous solution provides for the toothed ring of the guide means to extend in the drive section on a side of the teeth facing the drive shaft, wherein this solution is advantageous, in particular, when the toothed ring and the teeth are arranged on a side of the gear wheels or of the orbital path facing away from the tool carrier housing.

Additional features and advantages of the invention are the subject matter of the following description as well as the drawings illustrating several embodiments.

Figure 1:
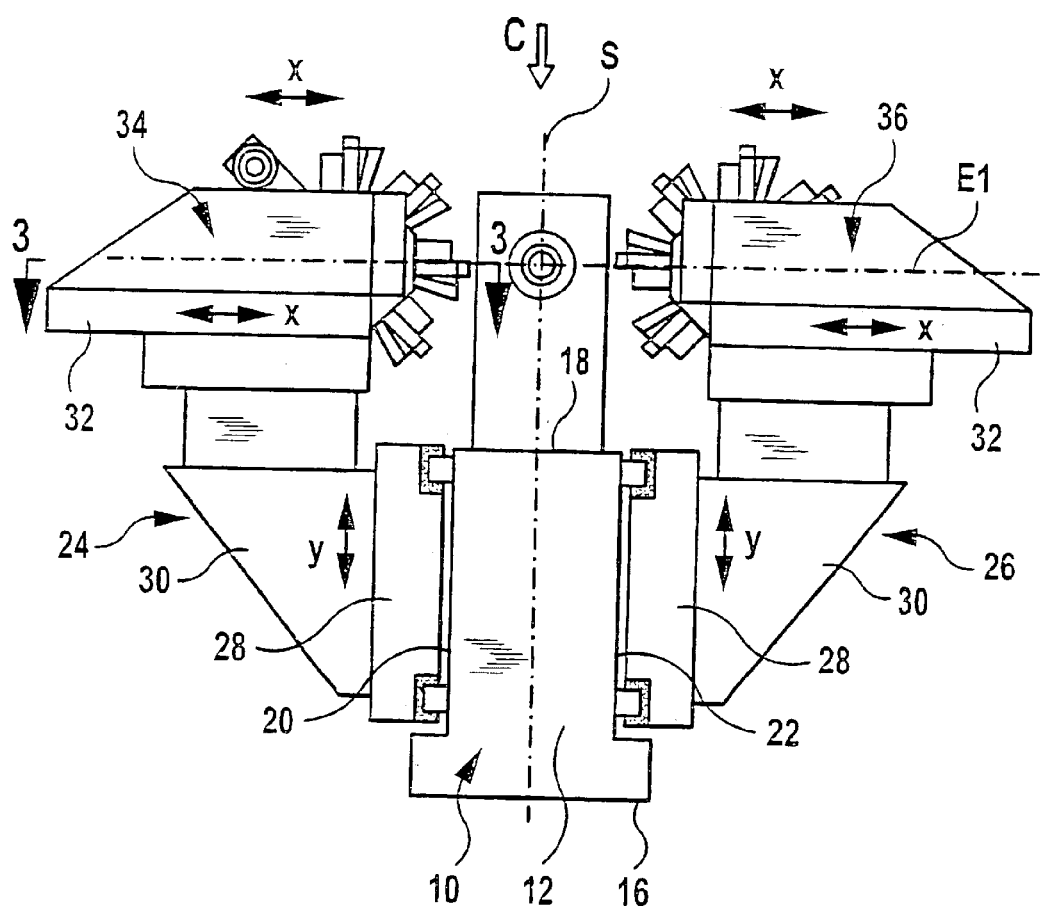
FIG. 1 shows a view of a first embodiment of an inventive machine tool in the direction of arrow B in FIG. 2.
Figure 2:
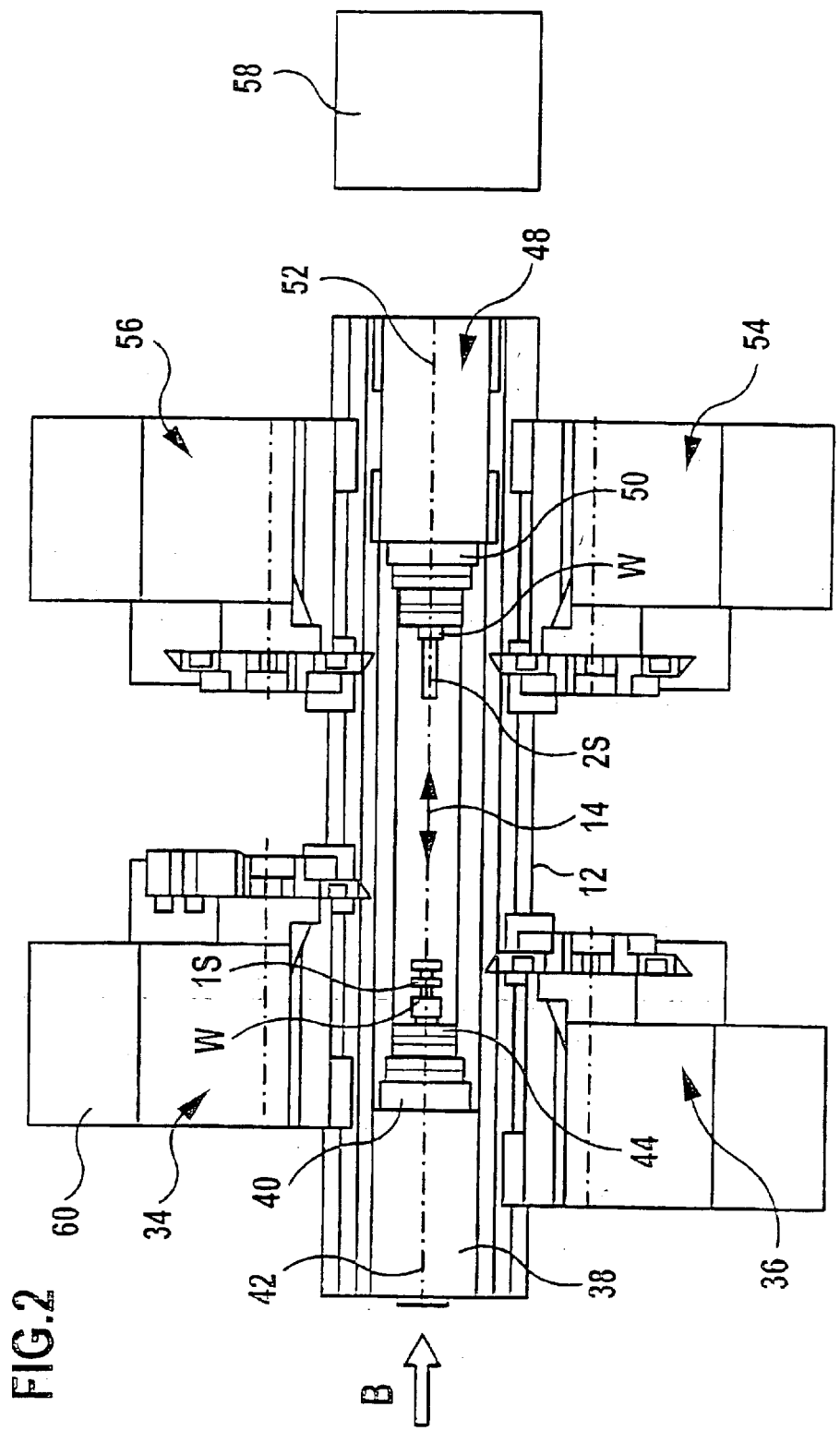
FIG. 2 shows a plan view of the first embodiment of the inventive machine tool in the direction of arrow C in FIG. 1.

A first embodiment of an inventive machine tool illustrated in FIGS. 1 and 2 comprises a machine frame designated as a whole as 10 with a machine base member 12 which, as illustrated in FIG. 2, extends in a longitudinal direction 14 in the shape of a beam. The machine base member 12 has a base side 16, with which the machine base member can be placed, for example, on a base frame not illustrated in the drawings or on a support surface, and a spindle support side 18 which is arranged on the machine base member 12 so as to be located opposite the base side 16.

Slide support sides 20 and 22, on which slide systems 24 and 26, respectively, are arranged and guided, extend between the base side 16 and the spindle support side 18 on both sides of the machine base member, wherein each of the slide systems 24, 26 comprises a Z slide 28, a Y slide 30 and an X slide 32 which can be moved in the customary X, Y and Z directions of the machine tool.

Each of these slide systems 26, 28 bears a tool carrier designated as a whole as 34 and 36, respectively, wherein the tool carriers 34, 36 are arranged on oppositely located sides of a work spindle 40 which is mounted in a spindle housing 38 and, for its part, is mounted in the spindle housing 38 so as to be rotatable about a spindle axis 42.

The work spindle 40 comprises, in addition, a workpiece receiving means 44, in which a workpiece W is held which can be machined, for example, on its side 1S by means of tools of the tool carriers 34, 36.

The machine tool, as illustrated in FIG. 2, is preferably constructed as a counterspindle machine so that a second work spindle 50 is mounted in a second spindle housing 48 on the machine base member 12 on a side located opposite the first work spindle 40 so as to be rotatable about a second spindle axis 52 which can preferably be aligned coaxially to the spindle axis 42 and tool carriers 54 and 56, which can be designed similar or identical to the tool carriers 34 and 36, are arranged on both sides of the second work spindle 50.

As a result, it is possible to finish machining of the workpiece W, for example, on a second side 25 after its transfer from the first work spindle 40 to the second work spindle 50.

All the machining work can be controlled by a programmable control 58.

Such a machine tool is described, for example, with additional details in German patent application No. 100 48 291.0-14, to which reference is made in full with respect to the individual features of this machine tool.

One of the tool carriers 34, 36, 54, 56 comprises, as explained, for example, on the basis of the tool carrier 34 a tool carrier housing 60, in which a tool carrier head designated as a whole as 62 is held for rotation about an axis 64.

The mounting of the tool carrier head 62 is brought about, for example, via a bearing tube 66 which extends into the tool carrier housing 60 and is mounted therein for rotation by means of two bearings 68a, b.

The tool carrier head 62 comprises, for its part, a support member 70, in which a plurality of tool receiving means 72 are provided, into which tool units 74 for driven tools 76 can be inserted in an approximately radial direction in relation to the axis 64.

The tool units 74 preferably comprise a respective tool holder 78 with a tool spindle 80 which is mounted in a tool holder housing 82 for rotation about a tool axis 84.

For driving the tool units 74, these are provided with gear wheels 90 which can be rotated about a gear wheel axis 92 and project into an interior 94 of the support member 70 when tool units 74 are inserted into the tool receiving means 72. If, for example, the support member 70 has six tool receiving means 72 and all six tool receiving means 72 are equipped with a driven tool unit 74, altogether six gear wheels $90_1$ to $90_6$ project into the interior 94, as illustrated in FIG. 4, and all six gear wheels $90_1$ to $90_6$ are arranged such that they are located on a common orbital path 100 which is illustrated in FIG. 4 as a dashed line and extends as an orbital track around the axis 64.

If the tool carrier head 62 is provided, for example, with six tool receiving means 72 preferably arranged at the same angular spacing around the axis 64, the tool carrier head 62 can be rotated into at least six rotary positions around the axis 64, wherein in each rotary position one of the respective gear wheels $90_1$ to $90_6$ is located in one of the orbital stations $U_1$ to $U_6$ of the orbital path 100, wherein the orbital stations $U_1$ to $U_6$ are arranged so as to be stationary relative to the tool carrier housing 60. During the rotation of the tool carrier head 62, the individual gear wheels $91_1$ to $91_6$ migrate further on the orbital path 100 and so the gear wheels $90_1$ to $90_6$ can be moved from one of the orbital stations $U_1$ to $U_6$ into every other one of the orbital stations $U_1$ to $U_6$.

In each rotary position of the tool carrier head 62, at least one of the tool units 74 is in a work position A, in which machining of the workpiece W takes place. The work position A of the tool carrier head 62 is, for example, placed such that the tool unit located in it, for example, the tool unit $74_1$, due to the fact that the tool $76_1$ thereof is aligned in a plane parallel to the X direction and to the Z direction so that this can machine the workpiece W, wherein the gear wheel $92_1$ of this tool unit $74_1$ is located, in this case, in the orbital station $U_1$, as illustrated in FIG. 4.

Figure 4:
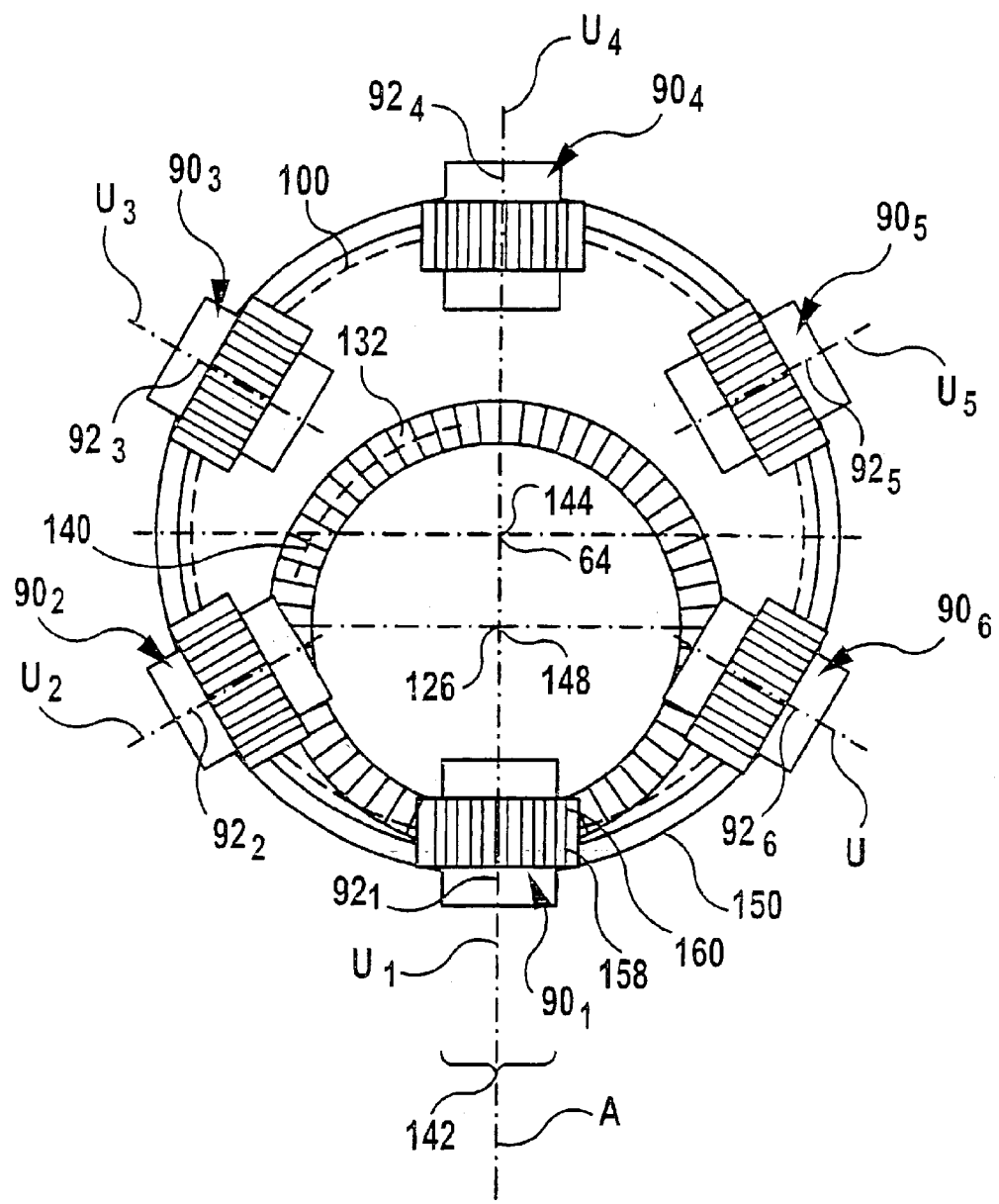
FIG. 4 shows a section along line 4-4 in FIG. 3 with exclusive illustration of teeth of a guide means and gear wheels engaging in these.

If one of the remaining tool units 74 is intended to be moved into the work position A, the tool carrier head 62 has to be turned into such a rotary position that the corresponding tool unit 74, for example, the tool unit $74_4$ is in the work position A, wherein, in this case, the gear wheel $90_4$ is also located in the orbital station $U_1$ and no longer, as illustrated in FIG. 4, in the orbital station $U_4$.

Figure 3:
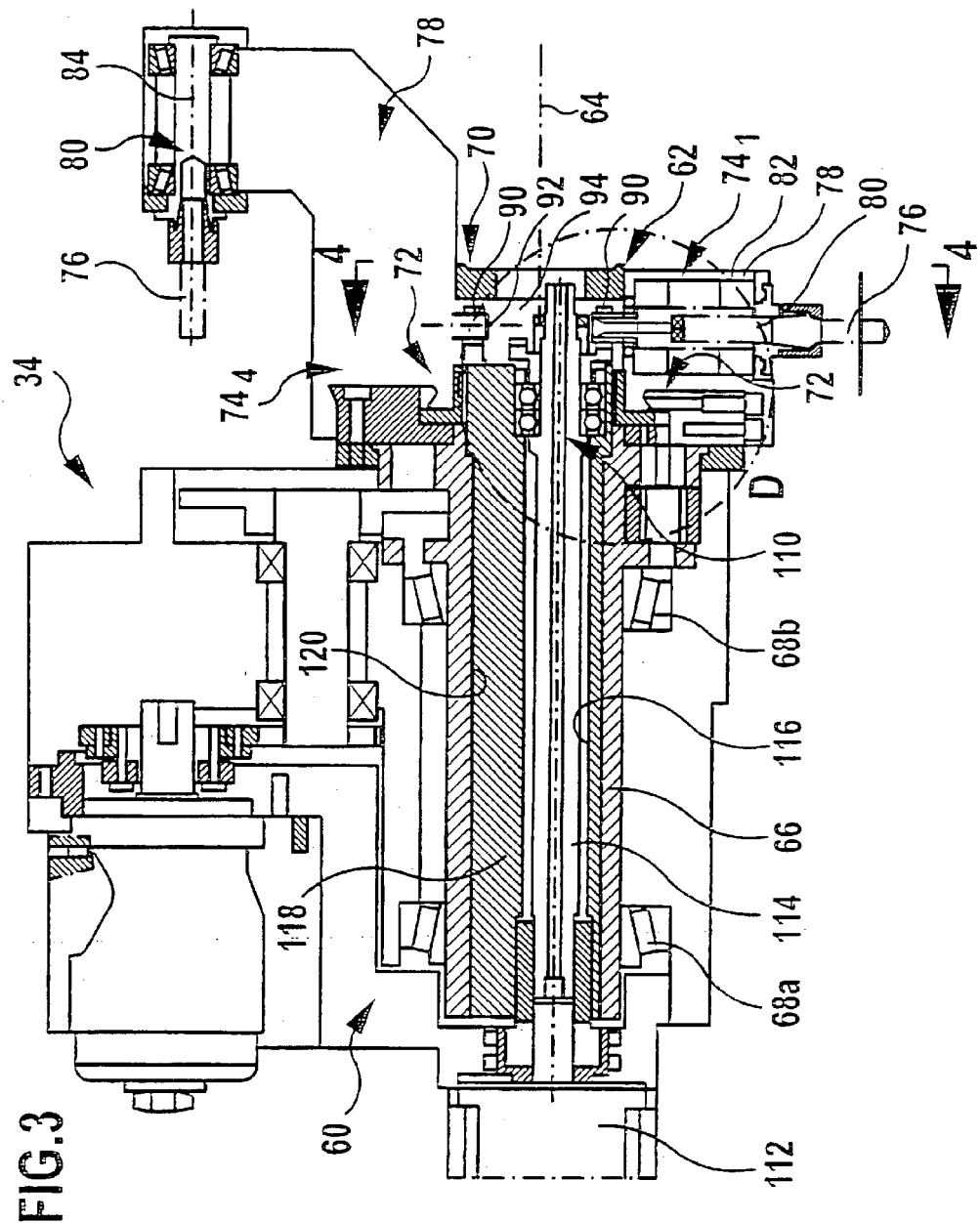
FIG. 3 shows a section along line 3-3 in FIG. 1.
Figure 5:
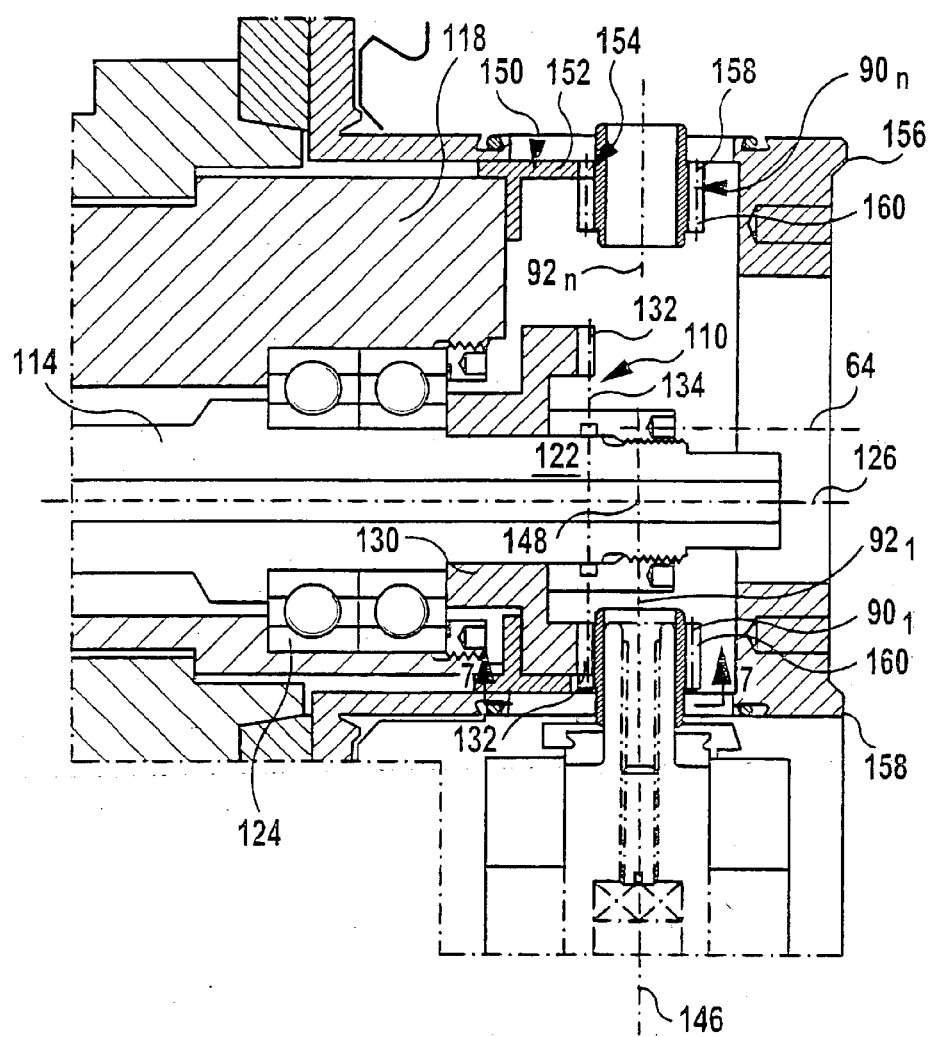
FIG. 5 shows an enlarged illustration of an area D in FIG. 3.

For driving at least the tool units 74 located in the work position A, a tool drive designated as a whole as 110 is provided, as illustrated in FIGS. 3, 4 and 5, and this has a drive motor 112 which is mounted on the tool carrier housing 60 and drives a drive shaft 114 which passes through an opening 116 in the bearing sleeve 118 which, for its part, engages through a central opening 120 of the bearing tube 66 and is supported on the bearing tube 66 so as to be rotatable, wherein the bearing sleeve 118 is connected non-rotatably to the tool carrier housing 60.

Within the bearing sleeve 118, the drive shaft 114 is mounted close to its front end area 122 by means of a rotary bearing 124 so as to be rotatable, wherein a drive axis 126 extends parallel but not coaxially to the axis 64, about which the tool carrier head 62 is rotatable in relation to the tool carrier housing 60, but rather offset parallel at a distance to it.

A drive wheel 130 is seated on the end area 122 of the drive shaft 114 and this is preferably designed as a crown wheel and has teeth 132 which are located, for example, in a plane 134 extending at right angles to the drive axis 126.

Figure 6:
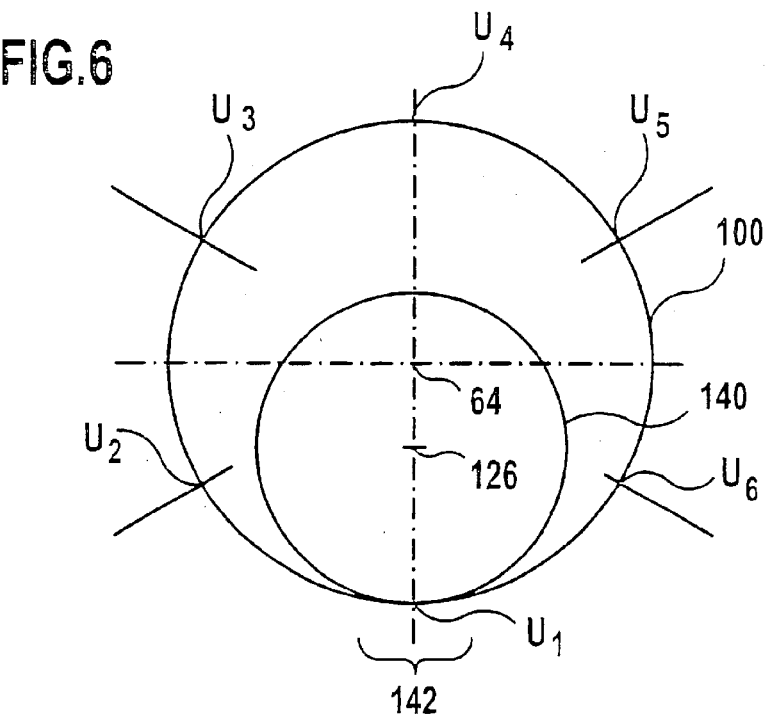
FIG. 6 shows an illustration of a relative position of an orbital path of the gear wheels in relation to a flight path of the teeth.

The teeth 132 move during the rotation of the drive wheel 130 on a flight path 140 about the drive axis 126, wherein the flight path 140 has, in a drive section 142, the smallest distances from the orbital path 100 and in all the sections of the orbital path 100 located outside the drive section 142 has a greater section from this, as illustrated in FIG. 6.

Furthermore, the drive section 142 is located such that the orbital station $U_1$ is located within the same.

As a result, each gear wheel 90 located in the orbital station $U_1$, for example, the gear wheel $90_1$ illustrated in FIG. 4 is driven by the teeth 132.

In addition, the flight path 140 of the teeth 132 preferably extends such that the gear wheels $90_2$ and $90_6$, which are located in the next adjacent orbital stations $U_2$, $U_6$ on the orbital path 100 in the two orbital directions, do not interact with the teeth 132 moving on the flight path 140 and so these gear wheels $90_2$ and $90_6$ are not driven by the teeth 132 of the drive wheel 126.

If the tool carrier head 62 is turned about the axis 64 so that, for example, the gear wheel $90_6$ is moved into the orbital station $U_1$, the gear wheel $90_1$ leaves the orbital station $U_1$ at the same time and arrives at the orbital station $U_2$, whereby the gear wheel $90_1$ disengages from the teeth 132 at the same time while the gear wheel $90_6$ comes into engagement with the teeth 132 upon reaching the drive section 142 of the orbital path 100 and is fully in engagement with the teeth 132 when reaching the orbital station $U_1$.

In order to bring about geometric ratios which are as favorable as possible, the gear wheels $90_1$ to $90_6$ are preferably arranged such that their gear wheel axes $92_1$ to $92_6$ all intersect the axis 64, namely preferably in a common point of intersection 144 of the gear wheel axes so that the gear wheel axes $92_1$ to $92_6$ are preferably located in a common surface area 146 symmetric to the axis 64, wherein this surface area 146 is, in the simplest case, a plane which extends at right angles to the axis 64.

In addition, as illustrated in FIG. 4 and FIG. 6, the drive axis 126 extends such that the gear wheel, in this case the gear wheel $90_1$, of the tool unit 74 located in the work position A is located in the orbital station $U_1$ and, in this respect, its gear wheel axis $92_1$ intersects the drive axis 126 at a point of intersection 148 of the drive position.

Not only the point of intersect 148 of the drive position, the point of intersection 144 of the gear wheel axes and, therefore, the gear wheel axes 92 are preferably all located in the plane 146.

In principle, it is conceivable in the case of the inventive solution not to define the gear wheels located outside the drive section 142 of the orbital path 100, in FIG. 4 the gear wheels $90_2$ to $90_6$, with respect to their rotary position about their gear wheel axes $92_2$ to $92_6$ for as long as no engagement with the teeth 132 of the drive wheel 130 takes place.

However, in order to ensure, when the respective gear wheel 90 enters the drive section 142, that the teeth of the respective gear wheel moved into the drive section 142 do not collide with the teeth 132 in such a manner that one of the sets of teeth is damaged, measures are provided which allow a collision-free engagement of the teeth 132 of the drive wheel 130 and the teeth of the respective gear wheel 90.

For example, it would be conceivable, in order to avoid collisions of this type, to turn the drive wheel 130 and, therefore, the teeth 132 simultaneously with the movement of the gear wheel 90 moving into the drive section 142 on the orbital path 100, namely with a slightly quicker circumferential speed or a slightly slower circumferential speed than the speed, with which the corresponding gear wheel 90 is moved on the orbital path 100 so that collisions of the stationary teeth 132 with the teeth of the stationary gear wheel 90 can be avoided.

Collisions of this type may be avoided in an even more advantageous manner when a guide means 150 illustrated in FIGS. 4, 5 and 6 is provided which guides all the gear wheels 90, which are located on the orbital path 100 outside the drive section 142, in a definitive rotary position about their respective gear wheel axis 92. This guide means 150 is, as illustrated, in particular, in FIG. 7, designed as a toothed ring 152, the row of teeth 154 of which extends on a cylindrical surface 156 about the axis 64 and the row of teeth 154 of which is located such that they engage the respective gear wheel 90 in its toothed area 158 located radially outwards while the teeth 132 engage in a toothed area 160 of the respective gear wheels 90 which is located radially inwards and separate from the toothed area 158.

The guide means 150 is arranged so as to be stationary within the support member 70 and is preferably securely connected to the bearing sleeve 118 so that the guide means 150 is also not rotatable about the axis 64 with the support member 70 and the gear wheel 90 moving on the orbital path 100 with the support member 70 then moves in a rolling manner on the guide means 150 when its toothed area 158 is in engagement with the row of teeth 154.

Figure 7:
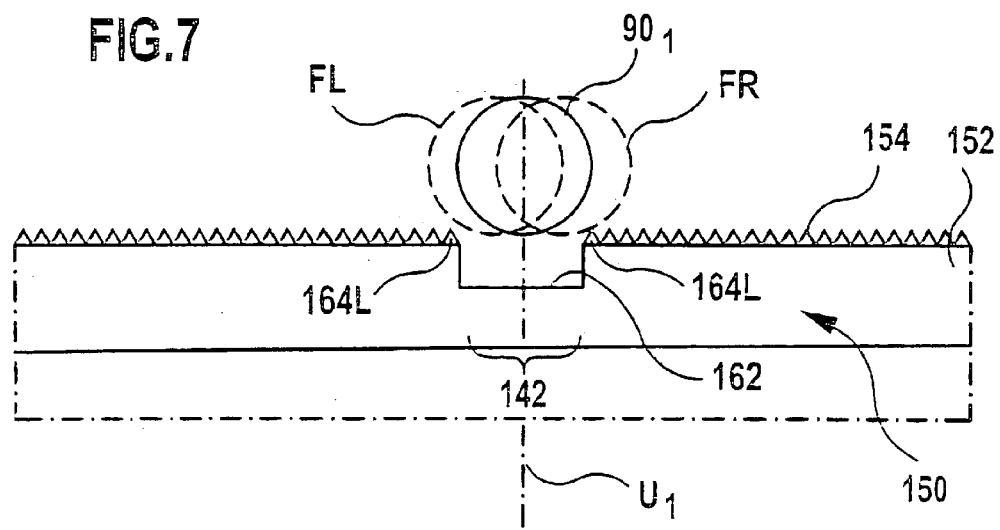
FIG. 7 shows an enlarged illustration of a section along line 7-7 in FIG. 5.

In order to allow a drive of the gear wheel 90 located in the drive section 142, for example, the gear wheel $90_1$ in FIG. 7 within this drive section 142 of the orbital path 100, the toothed ring 152, in particular, its row of teeth 154 has a section 162 so that each gear wheel 90 located within the drive section 142 is freely rotatable relative to the toothed ring 152 and, therefore, can be driven by means of the teeth 132 of the drive wheel 130 engaging in the toothed area 160 thereof.

If the corresponding gear wheel, for example, the gear wheel $90_1$ now migrates out of the orbital station $U_1$, it is still without interaction with the toothed ring 152 within the drive section 142 for such a time until one of two guidance transfer positions FL or FR is reached which are defined by the fact that in them the respectively first tooth 164L or 164R of the row of teeth 154 comes into engagement with the toothed area 158 of the gear wheel 90, in this case the gear wheel $90_1$, and, therefore, a defined rotary position of the gear wheel $90_1$ is determined in relation to the toothed ring 152 and is maintained for such a time until the gear wheel $90_1$ again reaches one of the guidance transfer positions FL or FR and is moved via this into the drive section 142.

In all the positions between the guidance transfer positions FL and FR outside the drive section 142, the respective gear wheel 90 is held by the row of teeth 154 of the toothed ring 152 in a defined rotary position about its respective gear wheel axis 92 in relation to the rotary position about its respective gear wheel axis 92 in the guidance transfer positions FL and FR and so the respective gear wheel 90 has an exactly defined rotary position, namely that corresponding to the transfer positions FL and FR, when reaching one of the guidance transfer positions FL and FR, irrespective of the rolling movement of this gear wheel 90 on the toothed ring 152.

If the drive unit 110 is designed as a C axis drive, i.e., as a drive, with which every optional angular position can be approached in a controlled manner by means of the control 58, the drive wheel 130 with the teeth 132 may be controlled by means of the control 58, which also controls the rotation of the support member 70 about the axis 64 at the same time, such that the teeth 132 are located in the respective guidance transfer position FL or FR exactly matching the rotary position of the gear wheel 90 and, therefore, come into engagement with the toothed area 160 of the gear wheel 90 without any collision while the respective gear wheel 90 is being moved completely into the drive section 142 and, therefore, the non-rotatable connection between the toothed area 158 of the gear wheel 90 and the toothed ring 152 is being released.

As a result, it is possible to bring the toothed area 160 of the respective gear wheel 90 into engagement with the teeth 132 without any collision in the guidance transfer positions FL and FR while the connection between the toothed area 158 and the toothed ring 152 is being released or to bring the toothed area 158 into engagement with the toothed ring 152 without any collision while the connection between the teeth 132 and the toothed area 160 is being released, wherein it is also possible, in this case, due to the C axis to transfer the gear wheel 90 in the guidance transfer position FL, FR, due to suitable rotation of the drive wheel 130 with the teeth 132, exactly in the rotary position, in which the respectively first tooth 164L or 164R can engage with the toothed area 160.

In a second embodiment of an inventive machine tool, illustrated in FIGS. 8 to 11, those parts which are identical to those of the first embodiment are provided with the same reference numerals and so reference is made in full to the comments on the first embodiment with respect to the description thereof and only the differences in comparison with the first embodiment will be explained in detail.

Figure 8:
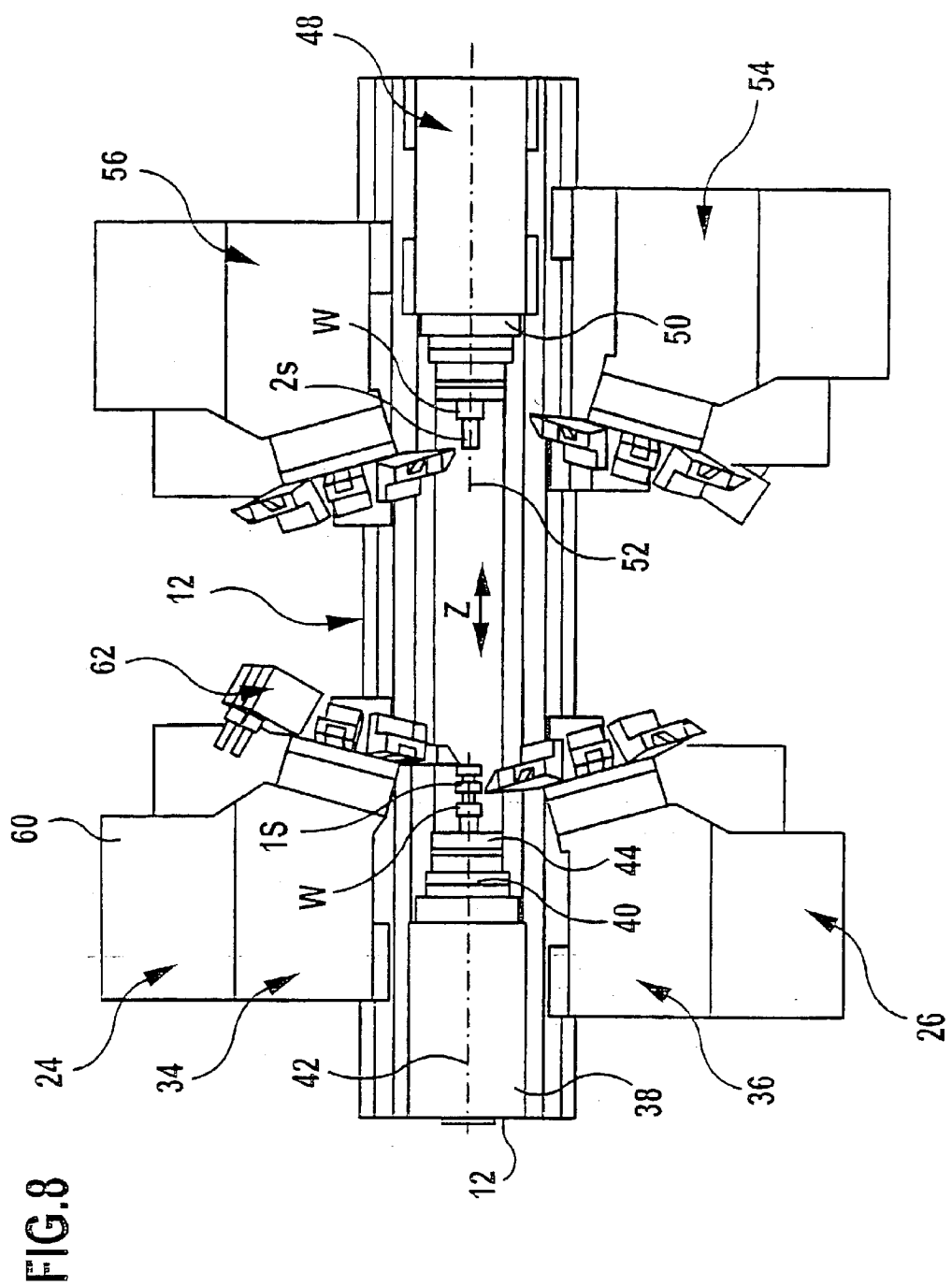
FIG. 8 shows a plan view similar to FIG. 2 of a second embodiment of an inventive machine tool.
Figure 9:
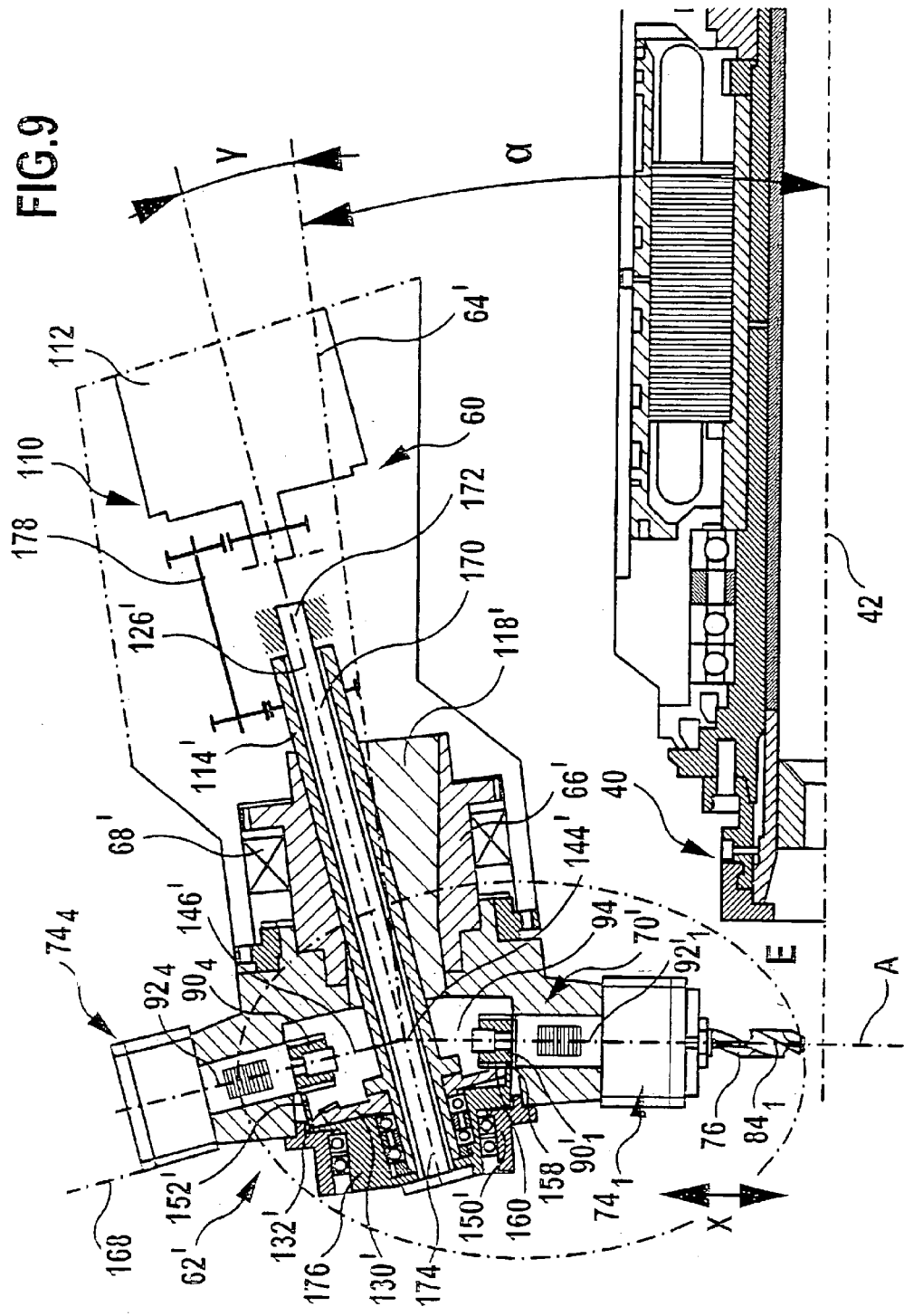
FIG. 9 shows a section similar to FIG. 3 of the second embodiment of the inventive machine tool.

In the second embodiment, as illustrated in FIGS. 8 and 9, the axis of rotation 64', about which the tool carrier head 62' is rotatable in relation to the tool carrier housing 60, does not extend parallel to the spindle axis 42 but rather at an angle α to it.

On the other hand, this results in the support member 70' of the tool carrier head 62' being designed such that the tool units 74 extend in the work position A of the respective tool unit 74 with their tool axes 84 preferably at right angles to the spindle axis 42, namely in the so-called X direction of the machine tool and so the tool axes 84 cannot extend at right angles or parallel to the axis 64.

The gear wheels 90' arranged in the interior 94 of the support member 70' are thereby located with their gear wheel axes 92' in a surface area 146' which is symmetric to the axis of rotation 64' but, in this case, no longer represents a plane but rather a conical surface area with the axis 64' as axis of the cone.

Furthermore, the gear wheel axes 92' likewise intersect in a point of intersection 144' of the gear wheel axes and this coincides at the same time with the tip of the conical surface 146'.

For the support of the tool carrier head 62' this is preferably mounted in the tool carrier housing 60 with a radial bearing 68'.

In order to bring about a non-coaxial arrangement of the drive wheel 130', the drive axis 126' is, in this case, not arranged so as to be offset parallel to the axis 64' but is rather inclined at an acute angle γ in relation to it, wherein the drive axis 126' preferably intersects the axis of rotation 64' in the point of intersection 144' of the gear wheel axes which is, therefore, a drive axis point of intersection at the same time.

In this case, the drive shaft 114' of the drive unit 110' likewise passes through a bearing sleeve 118' which is non-rotatably arranged but is supported by a rotatable bearing on a bearing attachment 66' of the tool carrier head 62'.

For driving the gear wheels 90' by means of a drive wheel 130' with teeth 132', which is rotatable about the drive axis 126' non-coaxial to the axis 64', the drive wheel 130' extends radially to the drive shaft 114' in a plane 168 which is inclined in relation to the orbital path 100', on which the gear wheels 90' can be moved during the rotation of the support member 70' about the axis 64', and so the flight path 140' is also located in this plane 168 (FIGS. 9, 10) and, therefore, likewise comes so close to the orbital path 100' only within the drive section 142' (FIG. 11) that the teeth 132' can interact with the gear wheel 90' located in the drive section 142' only in the area of this drive section 142' and can drive it.

In all the other positions of one of the gear wheels 90' on the orbital path 100', there is no interaction between the teeth 132' and one of the gear wheels 90'.

Figure 10:
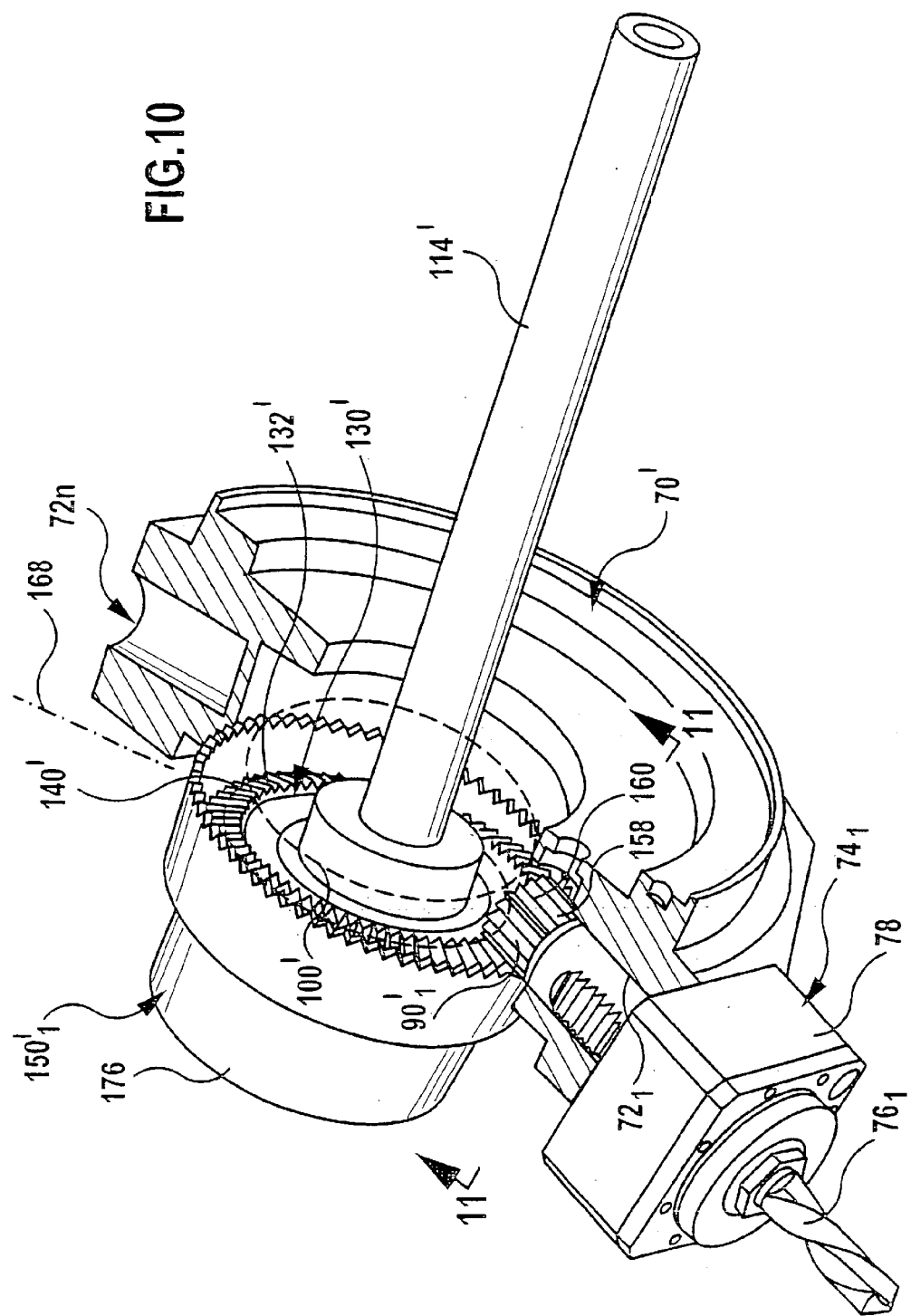
FIG. 10 shows a perspective enlarged illustration of an area E in FIG. 9.
Figure 11:
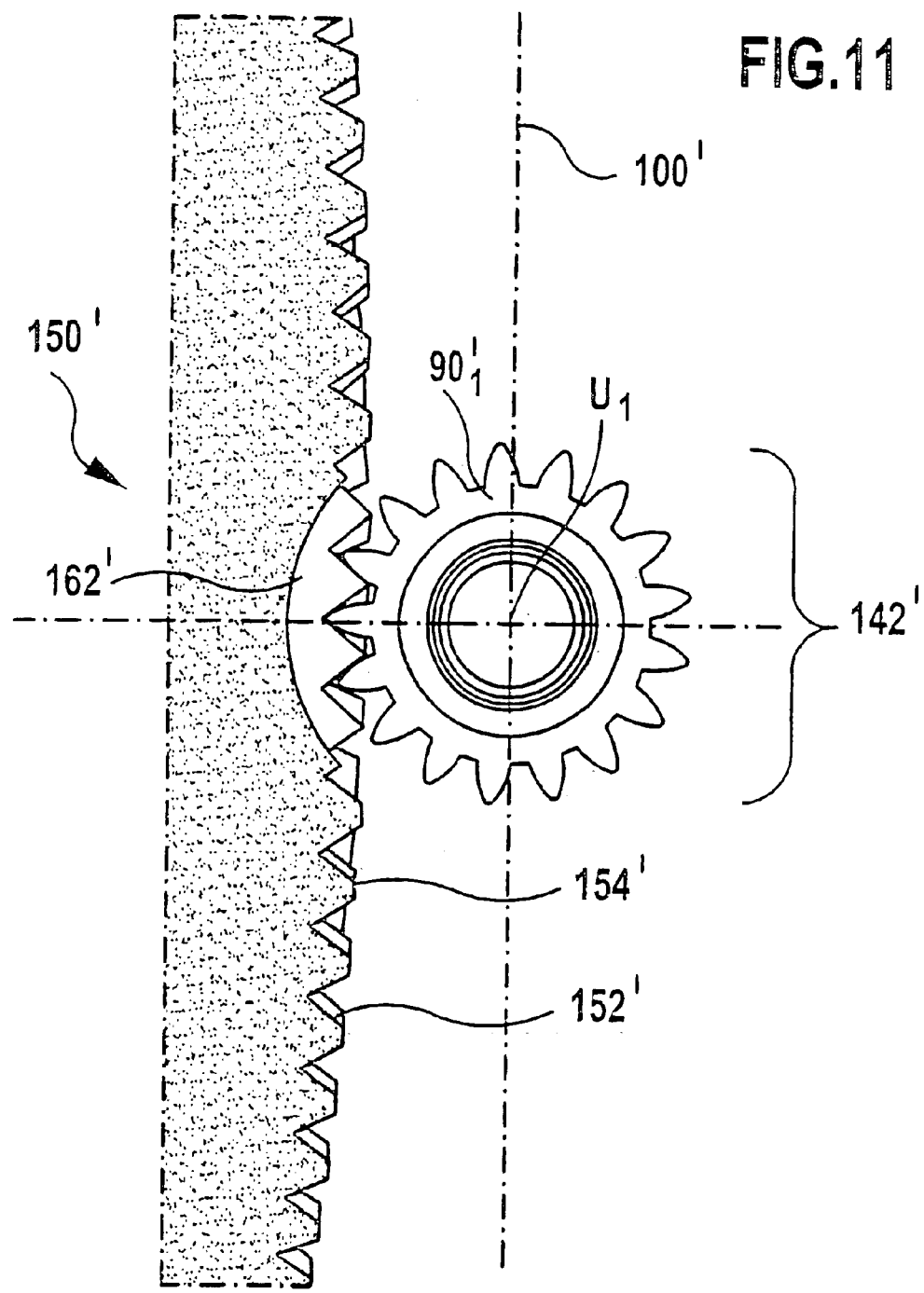
FIG. 11 shows a section along line 11-11 in FIG. 10.

In order, in addition, to likewise provide a guide means 105', which conveys a defined rotary position to the gear wheels 90', for all the gear wheels 90' located outside the drive section 142', the toothed ring 152' is, as illustrated in FIGS. 10 and 11, provided with a row of teeth 154', wherein the toothed ring 152' likewise has the section 162' in the area of the drive section 142' in order to avoid any interaction between the gear wheel 90' located within the drive section 142' and the toothed ring 152' and so the second embodiment functions with respect to the guide means 150' in cooperation with the drive wheel 130' in the same way as described in conjunction with the first embodiment, wherein the drive unit 110' is likewise designed as a C axis drive.

In order to be able to arrange the guide means 150' so as to be non-rotatable in relation to the tool carrier housing 60 so that the guide means 150', in the same way as in the first embodiment, cannot co-rotate about the axis 64' with the support member 70', the drive shaft 114' is designed as a hollow shaft and a support shaft 170 extends through this, this support shaft being connected securely at one end 172 to the tool carrier housing 60 and being connected non-rotatably at the outer end 174 to a bearing member 176, on which the drive shaft 114' is, on the one hand, supported so as to be mounted for rotation and which, for its part, is mounted so as to be rotatable relative to the support member 70' so that the support member 70' can turn relative to the bearing member 176.

Furthermore, the drive shaft 114' is driven via a gear train 178 by means of the drive motor 112 of the drive unit 110.

The second embodiment also differs from the first embodiment in that the drive wheel 130' and the guide means 150' are arranged on a side of the gear wheels 90' located opposite the tool carrier housing 60 whereas, in the case of the first embodiment, the drive wheel 130 and the guide means 150 are arranged on the side of the gear wheels 90 facing the tool carrier housing 60.

With respect to explaining the functioning of the second embodiment in detail, in particular, with respect to the engagement of the respective gear wheel 90' with the teeth 132' of the drive wheel 130' or the row of teeth 154' of the toothed ring 152', reference is made in full to the comments on the first embodiment.

Figure 12:
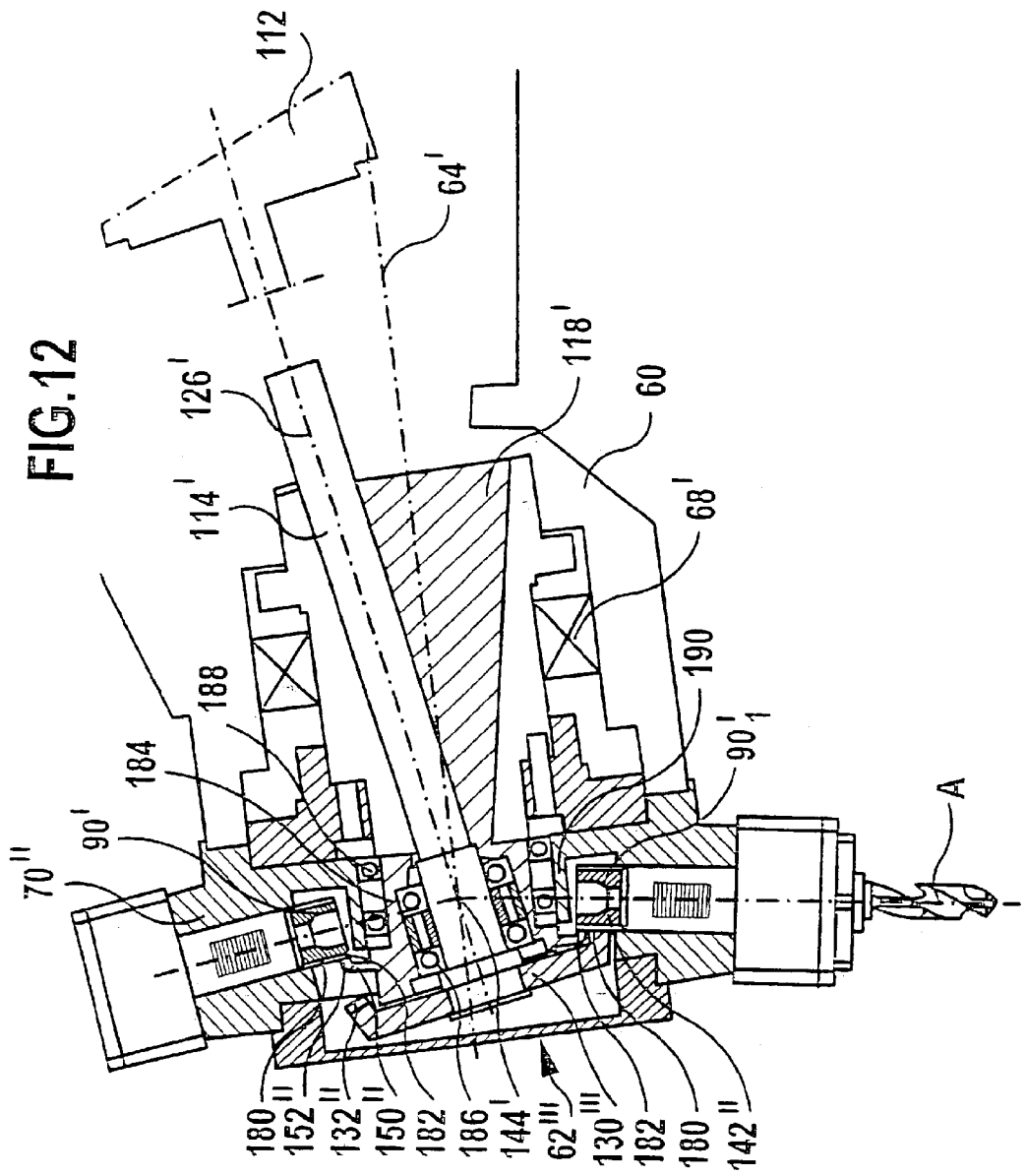
FIG. 12 shows a section similar to FIG. 9 through a third embodiment of an inventive machine tool.

A third embodiment of an inventive machine tool, illustrated in FIG. 12, represents a modification of the second embodiment.

In modification of the second embodiment, the drive wheel 130" of the third embodiment is designed such that the teeth 132" of the drive wheel 130" engage in the drive section 142" in a toothed area 180 of the gear wheel 90'$_1$ located in the work position A, this toothed area being located on a side of a toothed area 182, in which the guide means 150" engages with its toothed ring 152", facing away from the drive shaft 114'.

As a result, it is possible to connect the guide means 150" rigidly to the bearing sleeve 118' by means of a support sleeve 184, wherein the drive shaft 114' is mounted within the support sleeve 184 by means of a rotary bearing 186 so as to be rotatable about the drive axis 126'.

Furthermore, the support sleeve 184 is, for its part, supported by a rotary bearing 188 on the support member 70" which is provided for this purpose with a supporting flange 190 which extends with respect to the axis 64' radially within the gear wheels 90' which can be moved in the manner described on the orbital path 100 about the axis 64' due to rotation of the support member 70'.

As for the rest, reference is made in full to the preceding embodiments with respect to the interaction between the guide means 150" and the teeth 132".

What is claimed is:

1. Machine tool comprising
a machine frame, a tool carrier with a tool carrier housing and a tool carrier head mounted on the tool carrier housing for rotation about an axis, said tool carrier head having a support member with a plurality of tool receiving means, drivable tool units being insertable into said tool receiving means such that gear wheels for driving all the tool units insertable into the tool receiving means are arranged in an interior of the support member on an orbital path extending around the axis and are movable on the orbital path during rotation of the tool carrier head,
a tool drive with a drive wheel arranged in the interior of the support member and drivable by a drive motor, at least one of the gear wheels being drivable with said drive wheel,
wherein the drive wheel is rotatable about a drive axis arranged non-coaxially in relation to the axis, wherein teeth of the drive wheel move around the drive axis on a flight path extending relative to the orbital path of the gear wheels such that in a drive section of the orbital path the distances between this and the flight path have the lowest values and are greater in all the other sections of the orbital path and wherein the teeth are in drive engagement with a gear wheel located in the drive section and extend without contact in relation to each gear wheel located outside the drive section on the orbital path.

2. Machine tool as defined in claim 1, wherein the tool carrier head has the same work positions for each driven tool unit insertable into one of the tool receiving means and wherein for each tool unit located in these work positions the gear wheel is located within the drive section.

3. Machine tool as defined in claim 2, wherein each tool unit of the tool carrier head has a work position determined by a fixed angular position, the gear wheel being located in an orbital station on the orbital path in said work position, and wherein at least the orbital station is located within the drive section.

4. Machine tool as defined in claim 3, wherein only a single orbital station is located within the drive section.

5. Machine tool as defined in claim 1, wherein the gear wheels are arranged such that their gear wheel axes intersect the axis.

6. Machine tool as defined in claim 5, wherein the gear wheel axes intersect the axis with one another in a common point of intersection of the gear wheel axes.

7. Machine tool as defined in claim 1, wherein the drive axis is arranged so as to be offset parallel to the axis, the tool carrier head being rotatable about said axis.

8. Machine tool as defined in claim 1, wherein the drive axis extends at an angle in relation to the axis, the tool carrier head being rotatable about said axis.

9. Machine tool as defined in claim 8, wherein the drive axis and the axis intersect in a drive axis point of intersection.

10. Machine tool as defined in claim 9, wherein the point of intersection of the drive axes and the point of intersection of the gear wheel axes coincide.

11. Machine tool as defined in claim 1, wherein the area of the drive axis passing through the drive wheel extends on a side of the axis facing the drive section of the orbital path.

12. Machine tool as defined in claim 1, wherein the drive axis and the axis are located in one plane.

13. Machine tool as defined in claim 12, wherein the plane extends parallel to the X axis of the machine tool.

14. Machine tool as defined in claim 1, wherein the tool drive is designed as a C axis drive controllable by means of a control.

15. Machine tool as defined in claim 1, wherein the teeth of the drive wheel and the gear wheel to be brought into engagement with them are adapted to be brought into a defined rotary position relative to one another prior to their engagement.

16. Machine tool as defined in claim 15, wherein a guide means is provided for preliminarily positioning the gear wheel moving into the teeth of the drive wheel during the rotation of the tool carrier head such that it is adapted to be brought into engagement with the teeth of the drive wheel essentially collision-free.

17. Machine tool as defined in claim 16, wherein the guide means brings the gear wheel into a defined rotary position relative to the teeth of the drive wheel prior to the engagement with the teeth of the drive wheel.

18. Machine tool as defined in claim 17, wherein the guide means brings the gear wheel into engagement with the teeth of the drive wheel whilst rotating.

19. Machine tool as defined in claim 1, wherein each gear wheel passes through a respective guidance transfer position when leaving the drive section and when entering the drive section and wherein outside the drive section between the guidance transfer positions each gear wheel is in a constantly defined rotary position in relation to these guidance transfer positions.

20. Machine tool as defined in claim 19, wherein the defined rotary position in relation to the guidance transfer positions is maintained by a guide means.

21. Machine tool as defined in claim 20, wherein the guide means turns the gear wheels further in a defined rotary position.

22. Machine tool as defined in claim 16, wherein the guide means is arranged so as to be non-rotatable in relation to the tool carrier housing.

23. Machine tool as defined in claim 16, wherein the guide means and the drive wheel are arranged on the same side of the orbital path.

* * * * *